(12) United States Patent
Tu et al.

(10) Patent No.: US 8,305,682 B2
(45) Date of Patent: Nov. 6, 2012

(54) OPTICAL FREQUENCY UP-CONVERSION OF FEMTOSECOND PULSES INTO TARGETED SINGLE BANDS IN THE VISIBLE AND ULTRAVIOLET

(75) Inventors: Haohua Tu, Savoy, IL (US); Stephen A. Boppart, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 273 days.

(21) Appl. No.: 12/807,772

(22) Filed: Sep. 14, 2010

(65) Prior Publication Data

US 2011/0063718 A1  Mar. 17, 2011

Related U.S. Application Data

(60) Provisional application No. 61/276,774, filed on Sep. 16, 2009.

(51) Int. Cl.
*G02F 1/365* (2006.01)
(52) U.S. Cl. ........... 359/327; 372/21; 359/326; 385/122
(58) Field of Classification Search .......... 359/326–332; 372/21–22; 385/122
See application file for complete search history.

(56) References Cited

U.S. PATENT DOCUMENTS

| | | | |
|---|---|---|---|
| 6,775,447 B2 * | 8/2004 | Nicholson et al. | 385/122 |
| 7,130,512 B2 * | 10/2006 | Kuksenkov et al. | 385/122 |
| 7,768,691 B2 * | 8/2010 | Nerin et al. | 359/326 |
| 8,040,929 B2 * | 10/2011 | Imeshev et al. | 372/21 |

OTHER PUBLICATIONS

Dudley, et al., "Supercontinuum generation in photonic crystal fiber," *Reviews of Modern Physics*, vol. 78, pp. 1135-1184, Oct.-Dec. 2006.
Mitrofanov, et al., "Highly birefringent silicate glass photonic-crystal fiber with polarization-controlled frequency-shifted output: A promising fiber light source for nonlinear Raman microspectroscopy," *Optics Express*, vol. 14, No. 22, pp. 10645-10651, Oct. 30, 2006.
Kirchner, et al., "A low-threshold self-referenced Ti:Sapphire optical frequency comb," *Optics Express*, vol. 14, No. 20, pp. 9531-9536, Oct. 2, 2006.
Tauser, et al., "Widely tunable sub-30-fs pulses from a compact erbium-doped fiber source," *Optics Letters*, vol. 29, No. 5, pp. 516-518, Mar. 1, 2004.
Cristiani, et al., "Dispersive wave generation by solitons in microstructured optical fibers," *Optics Express*, vol. 12, No. 1, pp. 124-135, Jan. 12, 2004.
Skryabin, et al., "Soliton Self-Frequency Shift Cancellation in Photonic Crystal Fibers," *Science*, vol. 301, pp. 1705-1708, Sep. 19, 2003.
Tartara, et al., "Blue light and infrared continuum generation by soliton fission in a microstructured fiber," *Applied Physics B*, vol. 77, pp. 307-311, Jun. 6, 2003.

* cited by examiner

*Primary Examiner* — Daniel Petkovsek
(74) *Attorney, Agent, or Firm* — Sunstein Kann Murphy & Timbers LLP (57) ABSTRACT

An apparatus and methods for generating a substantially supercontinuum-free widely-tunable multimilliwatt source of radiation characterized by a narrowband line profile. The apparatus and methods employ nonlinear optical mechanisms in a nonlinear photonic crystal fiber (PCF) by detuning the wavelength of a pump laser to a significant extent relative to the zero-dispersion wavelength (ZDW) of the PCF. Optical phenomena employed for the selective up-conversion in the PCF include, but are not limited to, four-wave mixing and Cherenkov radiation. Tunability is achieved by varying pump wavelength and power and by substituting different types of PCFs characterized by specified dispersion properties.

9 Claims, 8 Drawing Sheets
(6 of 8 Drawing Sheet(s) Filed in Color)

OPTICAL FREQUENCY UP-CONVERSION OF FEMTOSECOND PULSES INTO TARGETED SINGLE BANDS IN THE VISIBLE AND ULTRAVIOLET

The present application claims priority from U.S. Provisional Application Ser. No. 61/276,774, filed Sep. 16, 2009, and incorporated herein by reference.

This invention was made with government support under Grants 1 R21 CA115536-01A2, Roadmap Initiative 1 R21 EB005321, and NIBIB 1 R01 EB005221, awarded by the National Institutes of Health, and under Grants BES 03-47747, BES 05-19920 and BES 06-19257, awarded by the National Science Foundation. The Government has certain rights in the invention.

TECHNICAL FIELD

The present invention relates to methods and apparatus for frequency up-conversion of pulses of light, and, more particularly, to up-conversion of light in a photonic crystal fiber in processes that may be referred to, generally, as selective wavelength conversion of femtosecond pulses.

BACKGROUND ART

Compact ultrafast (ps or fs) fiber-based pulsed sources, particular in the visible and ultraviolet (UV) portions of the electromagnetic spectrum, are in high demand for such applications as ultrafast spectroscopy, fluorescence spectroscopy, photochemistry and photophysics, multiphoton microscopy, fluorescence lifetime imaging, non-linear biomedical imaging, and precision optical frequency metrology. As an example, many fluorescent molecules of biomedical importance allow one-photon excitation within the 350-600 nm spectral range and two-photon excitation within the 500-700 nm spectral range. Desirable pulse properties, such as those of pulse duration, energy per pulse, and repetition rate, are more readily available in infrared sources, thus it is useful to up-convert infrared pulses into the visible while retaining, if not enhancing, requisite spectral and temporal characteristics.

Many applications, such as multiphoton microscopy and ultrafast spectroscopy, require narrowband ultrashort (<5 ps) pulses of a few milliwatts of average power that are widely tunable across a frequency up-converted region of the pump laser. While selective spectral filtering of the supercontinuum may lead to a useful multi-wavelength pulsed source, the elongated temporal width and the decreased pulse energy produce unavoidable adverse effects. The more attractive solution is to efficiently convert input pump power into the targeted spectral band (signal) using fiber-based nonlinear frequency up-conversion techniques.

Photonic crystal fibers (PCFs), optical waveguides exhibiting tailored group velocity dispersion and enhanced modal confinement (and thus concomitantly enhanced nonlinearity) have proven a convenient medium in which to achieve desired up-conversion and other non-linear processes. Numerous efforts have employed femtosecond pump lasers to generate broadband and flat supercontinuum output from PCFs with a power level on the order of tens of milliwatts. A survey of the state of the art may be found in the review paper of Dudley et al., *Supercontinuum Generation in Photonic Crystal Fiber, Rev. Mod. Phys.*, vol. 78, pp. 1135-84 (2006), which is incorporated herein by reference. The material and geometry of PCFs governs the zero dispersion wavelength (ZDW) of the fiber, which, in tapered fibers, may be varied as a function of length of the fiber.

One technique for up-conversion in a fiber is four-wave mixing excited at the slightly normal dispersion regime of the fiber (where the refractive index increases with frequency), which has been implemented in the form of an optical parametric oscillator. Wide tunability of the signal wavelength in the near-infrared and the visible can be achieved by tuning the pump wavelength across a relatively narrow (~20 nm) spectral region. Nonetheless, the pulse walk-off effect and the supercontinuum onset have largely restricted the pump-to-signal conversion efficiency on the order of 2%, thus preventing the generation of a multimilliwatt-level signal.

Propagation of waves in a PCF may be described by a generalized nonlinear Schroedinger equation (GNLSE), solutions of which include solitons that maintain their shape as they propagate in the fiber. Akhmediev et al., *Cherenkov radiation emitted by solitons in optical fibers, Phys. Rev. A*, vol. 51, pp. 2602-07 (1995), incorporated herein by reference, established that, under certain conditions, a soliton generates a dispersive wave in a process equivalent to a Cherenkov radiation process in the frame of reference of commoving time t and the propagation direction z of the soliton. Cherenkov radiation (CR) mediated by fiber solitons may also be referred to as dispersive wave generation, non-solitonic radiation, or soliton-induced resonant emission.

The feasibility of four wave mixing (FWM) in optical fibers has been pursued in several studies using single-mode FWM. In single-mode FWM, the pump, idler, and signal propagate in the same fiber mode. Sharping et al., *Four-wave Mixing in Microstructure Fiber, Opt. Lett.*, vol. 26, pp. 1048-50 (2001) described a highly nonlinear PCF with a deeply blue-shifted zero dispersion wavelength (ZDW), in which FWM was generated with a relatively small Stokes-shift (400 $cm^{-1}$). The Stokes-shift can be enlarged to 6000 $cm^{-1}$ by tapering a PCF to generate 535-570 nm anti-Stokes pulses, as described by Abedin et al., *Highly nondegenerate femtosecond four-wave mixing in tapered microstructure fiber, Appl. Phys. Lett.*, vol. 89, 171118 (2006). However, the two foregoing studies require seeding the Stokes field so that two collinear laser beams, corresponding to both the pump as well as the Stokes fields, must be incident on the fiber.

It has also been shown to be possible, for sufficiently large pump intensity, to amplify the FWM signal from quantum perturbation without seeding the idler externally. This has been achieved in a higher-order fiber mode of specially designed PCFs (i.e., the pump, signal and idler are generated in the same higher-order fiber mode rather than the fundamental fiber mode) to produce a 600-nm signal, as described by Konorov et al., *Generation of femtosecond anti-Stokes pulses through phase-matched parametric four-wave mixing in a photonic crystal fiber, Opt. Lett.*, vol. 29, 1545-47 (2004).

A disadvantage, however, of this operation is that offset pumping has to be employed to selectively excite the higher-order mode, significantly impairing the free-space-to-fiber coupling efficiency and achieving pump-to-signal conversion efficiencies of only 2%. More importantly, the wavelength-conversion selectivity of FWM is compromised by the presence of other nonlinear optical processes which promote supercontinuum (SC) generation. The SC contamination becomes more severe if the pump wavelength lies in the vicinity of the ZDW of the fiber, however such proximity to the ZDW is required for the phase-matching condition of the single-mode FWM.

One way in which FWM may be achieved absent SC contamination is to pump the fiber in a deeply normal dispersion regime and fulfill the phase-matching condition using different fiber modes. Such approach, termed intermodal FWM, was reported by Stolen et al., *Appl. Phys. Lett.*, vol. 24, pp. 308-10 (1974) in conventional multimode fiber. Intermodal FWM was also realized by Lin et al., *Appl. Phys. Lett.*, vol. 38, pp. 479-81 (1981) in specifically Ge-doped circular fibers pumped by 25-ps 532-nm pulses, suggesting that a series of Stokes-shifts up to 4300 cm$^{-1}$ could be obtained by a series of properly designed fibers. However, this feasibility has not been further pursued possibly because the FWM is unstable over time due to the well-known photosensitivity of the Ge dopant.

CR has been invoked for tunable frequency up-conversion and/or a multimilliwatt signal. Knox and co-workers introduced submillimeter-scale dispersion micromanagement into a short (~1 cm) PCF to generate femtosecond visible pulses from a Ti:sapphire laser. Unfortunately, the wavelength tunability of the pulses required a series of PCFs with different dispersion designs and a dedicated fiber-tapering facility (including a $CO_2$ laser) to fabricate. As to the underlying mechanism, the individual roles of CR and four-wave mixing remain rather unclear.

Leitenstorfer and co-workers used a dispersion-shifted germanosilicate fiber to up-convert the 1.55 μm wavelength of an amplified femtosecond Er:fiber laser into the 1130-1300 nm region, and then frequency-doubled into the 520-700 nm visible region. Wavelength tunability was achieved by tuning the chirp of the pump laser, and conversion efficiencies as high as 30% were described. However, the germanosilicate fiber employed requires special dispersion engineering and may be susceptive to structural change due to its well-known photosensitivity. Additionally, the technique demands both a specially-designed pump laser, and in the case of the visible signal, a specific frequency-doubling crystal. A more broadly application technology that can use a wider range of tunable infrared pump lasers and more general-purpose PCFs is thus desirable.

Zheltikov and co-workers invoked CR from birefringent PCFs to frequency up-convert the 820-nm and 1.24-μm pump wavelengths into the visible region. Although the birefringence of fibers allows for production of different frequency-shifted signals, the signal wavelength is not strictly tunable both because of a limited tuning range and because the broadened signal spectrum. A strictly tunable up-conversion system is thus desirable.

While switching the pump polarization can lead to slight tunability of the CR wavelength, a technology is desirable that provides tunability by virtue of tuning the pump wavelength, even at high pump power. Unfortunately, increased pump powers tend to initiate supercontinuum around the signal band and, therefore, compromise the pump-to-signal conversion selectivity. One explanation of the emergence of the supercontinuum is that sequentially ejected red-shifted fundamental solitons emit a mixture of resonant blue-shifted CR of distinct frequencies, as postulated by Herrmann et al., *Experimental evidence for supercontinuum generation by fission of higher-order solitons in photonic fibers*, Phys. Rev. Lett., vol. 88, No. 173901 (2002), which is incorporated herein by reference. Thus, CR has been considered as one mechanism initiating the blue edge of the supercontinuum, and at moderate pump powers, has appeared more as an irregular broadband feature than a narrowband line profile. It would be far more desirable, however, to provide supercontinuum-free widely-tunable multimilliwatt CR with a narrowband line profile that effectively extends the near-infrared emission wavelengths of a Ti:sapphire laser or a Yb-based laser, for example, to the UV-visible region.

SUMMARY OF THE INVENTION

Definition

As used herein, and in any appended claims, the term "substantially free of non-frequency-specific supercontinuum emission" shall indicate that at least 75% of the emitted power from a given fiber within the spectral range of 340-700 nm is concentrated in one specific spectral window spanning no more than 40 nm.

In accordance with embodiments of the invention, a method for generating broadly tunable visible or ultraviolet optical pulses substantially free of non-frequency-specific supercontinuum emission.

The method entails:

a. providing a pulsed source for generating pump pulses characterized by a spectrum having a central emission wavelength $\lambda_0$;

b. providing a photonic crystal fiber characterized by a short-wavelength zero dispersion wavelength; and c. pumping the fiber with the pump pulses at a pump wavelength, thereby exciting a nonlinear process in such a manner as to produces an isolated spectral band in the visible or ultraviolet characterized by a central wavelength that is tuned over a range of at least 20 nm and that is also characterized by a 10 dB bandwidth of less than 50 nm, and a power spectral density exceeding that of any continuum emission adjacent to it by at least 10 dB.

Tuning the isolated spectral band is preferably achieved either by varying the wavelength of the pump source or by exchanging photonic crystal fibers with different dispersion properties.

In other embodiments of the invention, the average power in the isolated spectral band may exceed 0.1 mW. The ZDW may be displaced by more than 100 nm from $\lambda_0$. The nonlinear process may be four-wave mixing or dispersive wave generation, or another phase-matching nonlinear optical process.

In yet further embodiments of the invention, the pulsed source may be a pulsed laser, and the pump pulses may be substantially transform-limited in bandwidth. The central wavelength of the isolated spectral band may be tuned in the visible or ultraviolet by at least one of varying the wavelength of the pump source and switching photonic crystal fibers with different dispersion properties.

In accordance with another aspect of the invention, a broadly tunable optical frequency upconverter is provided. The upconverter has a pulsed source for generating pump pulses characterized by a spectrum having a central emission wavelength $\lambda_0$ and a characteristic spectral width $\Delta\lambda$ (FWHM), and a photonic crystal fiber characterized by a short-wavelength ZDW displaced by more than 100 nm from the tunable central emission wavelength $\lambda_0$ of the pulsed laser source. A plurality of photonic crystal fibers of distinct types is provided, each fiber characterized by a short-wavelength zero dispersion wavelength displaced by more than 100 nm from the central emission wavelength $\lambda_0$ of the pulsed source, the types selected such that the plurality of types of photonic crystal fiber provide for generation of a specified range of tunable isolated spectral bands of output when pumped with the pulsed source.

In other embodiments of the invention, the PCF may be silica-based, and may have a pure silica core. The pulsed source may be an infrared source, and may be a laser, and, more particularly, a Ti:sapphire laser. The pulsed source may be characterized by a pulse duration (FWHM) in the range of 30-800 fs.

In accordance with yet a further embodiment of the invention, a kit of types of photonic crystal fibers is provided for use with the targeted optical frequency upconverter. The types are selected such that the plurality of types of photonic crystal fibers provide for targeting a specified spectral band of output when pumped with a specified pulsed source of constant wavelength.

BRIEF DESCRIPTION OF THE DRAWINGS

The patent or application file contains at least one drawing executed in color. Copies of this patent with color drawing(s) will be provided by the Patent and Trademark Office upon request and payment of necessary fee.

The foregoing features of the invention will be more readily understood by reference to the following detailed description, taken with reference to the accompanying drawings, in which.

DETAILED DESCRIPTION OF EMBODIMENTS OF THE INVENTION

In accordance with preferred embodiments of the present invention, a supercontinuum-free widely-tunable multimilliwatt emission with a narrowband line profile is generated in a short nonlinear PCF by detuning the pump wavelength of a Ti:sapphire laser from the zero-dispersion wavelength (ZDW) of the PCF to a significant extent. Optical mechanisms employed for the selective up-conversion in the nonlinear medium include, but are not limited to, FWM and CR.

Figure 1:
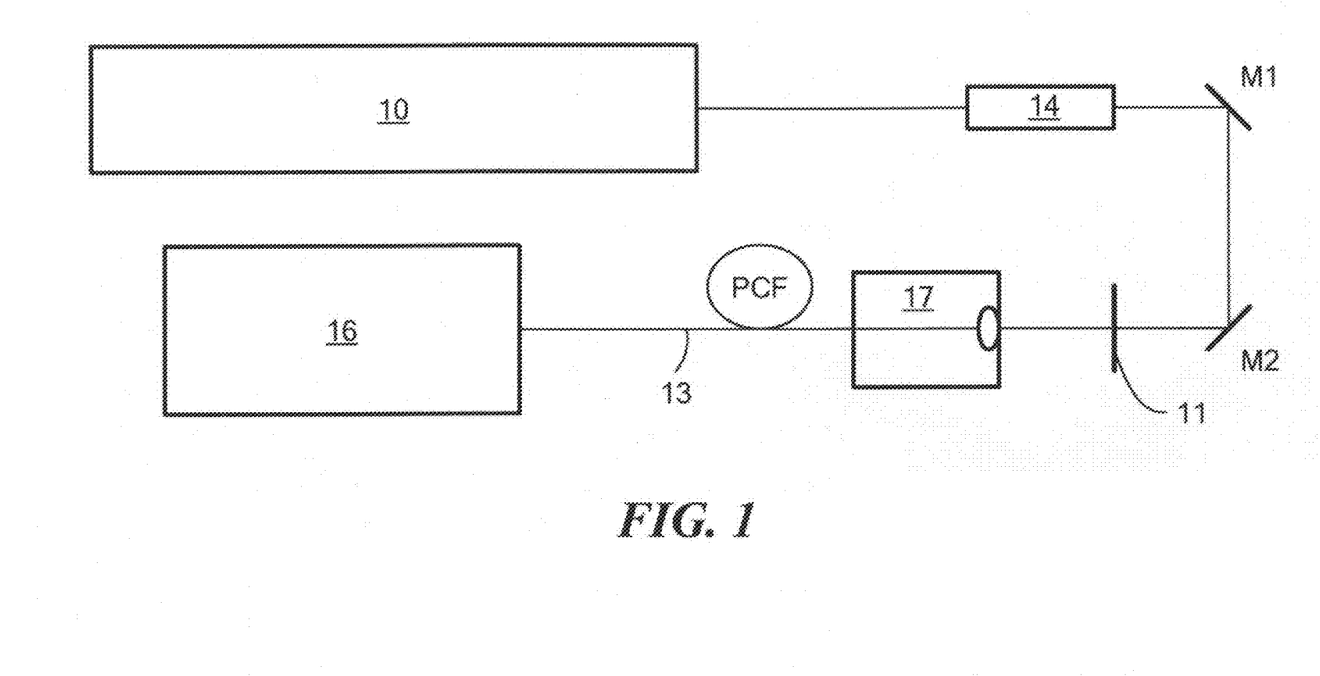
FIG. 1 is a schematic depiction of an optical pulse upconverter in accordance with embodiments of the present invention.

Basic components of a supercontinuum-free upconverter in accordance with embodiments of the present invention are now described with reference to FIG. 1. A pump source 10 provides pulses of electromagnetic radiation. In preferred embodiments, pump source 10 is a Ti:sapphire laser of widely-tunable wavelength, however the use of other pump sources is within the scope of the present invention. Input power $P_0$, taken as the laser power between neutral density attenuator 11 and aspheric lens 12, is varied, by an attenuator, within a range of 1-300 mW, although the scope of the invention is not limited to a particular range of pump power. Electromagnetic radiation from pump source 10, typically in the infrared, is coupled into a length of nonlinear photonic crystal fiber (PCF) 13. Various fiber lengths and PCF types may be employed in practice of the invention. A free-space-to-fiber coupling efficiency $\eta$ of ~50-85%, measured as the ratio of the power exiting the fiber to the input power, may be obtained, typically. In typical embodiments, the laser pulses have an initial FWHM width of ~170 fs, or a hyperbolic-secant pulse-width $T_0$ of ~100 fs, but the pulse are typically elongated to ~300 fs (FWHM) by an isolator 14 before entering the fiber 13. The spectrum of light emerging from the PCF may be monitored by one or more spectrometers 16 such as a fiber-optic spectrometer and/or an optical spectrum analyzer. In one experimental setup, a fiber-optic spectrometer was employed in the spectral range of 400-1050 nm, while an optical spectrum analyzer was employed over the range of 700-1700 nm, respectively.

In one embodiment of the invention, a cost-effective large-mode-area PCF (LMA-10, Crystal Fiber A/S) is employed, having a core diameter of 10 μm, a pitch Λ of 6.6 μm, and an air hole diameter d of 3.1 μm. While the use of any PCF is within the scope of the present invention, the PCF employed in accordance with the embodiment described by way of example consists of hexagonally arranged holes with uniform diameter d (at least for the inner 4 rings of holes), separated by a constant pitch Λ. The absence of the central hole defines the fiber core where light is confined, while the relatively small d/Λ ratio (i.e., air-fill fraction) extends the single-mode transmission deep into the short-wavelength edge. The PCF employed in accordance with this embodiment has a large core, which is easier to produce than a small-core PCF. The PCF may be silica based, and may have a silica core, and may exhibit substantially small birefringence, particularly, $\Delta n<10^{-4}$, and, typically, in the range of $10^{-7}$-$10^{-4}$.

The modes of a PCF can be numerically solved from the given fiber cross section by a well-established multipole method, described by White et al., *Multipole method for microstructured optical fibers. I. Formulation.*, J. Opt. Soc. Am. B, vol. 19, pp. 2322-30 (2002), which is incorporated herein by reference. In the wavelength range of 500-1500 nm, the calculated second mode (non-degenerative, mode class p=2) exhibits a small imaginary effective refractive index $n_i$ up to $2.5\times10^{-6}$, corresponding to a fiber transmission loss up to 94 dB/m. Thus, a short LMA-10 can be treated as a two-mode fiber even though the relatively small d/Λ value of 0.47 allows a long LMA-10 to be endlessly single-mode. The numerically calculated profiles of real effective refractive index $n_r$ of the two modes can be used to derive the corresponding dispersion profiles, yielding a zero-dispersion wavelength (ZDW) of 1199 nm and 1116 nm for the fundamental mode and the second mode, respectively.

Thus, the PCF is pumped in a deeply normal dispersion regime if pulses of a Ti:sapphire laser at a wavelength of approximately 800 nm are used. At a given wavelength, the intensity fields of the fundamental mode and the second mode can also be calculated. A phase-matching scheme similar to that observed from a conventional Ge-doped fiber, as described by Lin et al. (1981), that is, two fundamental-mode pump photons annihilate to produce one second-mode anti-Stokes photon and one second-mode Stokes photon. The phase-matching condition of such intermodal FWM can be written as $2\beta_{P,1}-\beta_{S,2}(\Omega)-\beta_{A,2}(\Omega)-2\gamma P=0$, where $\beta$ is the propagation constant and the corresponding subscripts identify the pump (P), Stokes (S) and anti-Stokes (A) in the fundamental (1) or the second (2) modes, $\Omega$ is the Stokes-shift, and $2\gamma P$ the nonlinear contribution. Phase matching in a non-linear fiber is discussed in Agrawal, *Nonlinear Fiber Optics* (Academic Press, 2007), which is incorporated herein by reference.

Neglecting the nonlinear contribution $2\gamma P$ in the interest of simplicity, the dependence of $\beta$ on wave number for both modes can be derived from the $n_r$ profiles and expanded as a Taylor series to the $2^{nd}$, $4^{th}$, or $6^{th}$ order near the pump wave number (corresponding to 808 nm) to solve the Stokes-shift $\Omega$, resulting in a value of 4443 cm$^{-1}$, 4647 cm$^{-1}$, or 4624 cm$^{-1}$, respectively. The $6^{th}$ order treatment can be conducted at the pump wavelength of 800 nm, 808 nm, and 825 nm, yielding a $\Omega$ value of 4511 cm$^{-1}$, 4624 cm$^{-1}$, and 4866 cm$^{-1}$ and an anti-Stokes wavelength of 587.9 nm, 588.2 nm, and 588.7 nm, respectively. Thus, the anti-Stokes wavelength is highly insensitive to the pump wavelength. It should be noted, by way of contrast, that in single-mode FWM the anti-Stokes wavelength can be highly sensitive to the pump wavelength. It is also noteworthy that $n_i$ at the corresponding Stokes wavelengths (~1250 nm) is much larger than $n_i$ at the anti-Stokes wavelengths. However, the large transmission loss of the idler does not necessarily prevent efficient pump-to-signal conversion.

With reference, again, to FIG. 1, in typical operation, the pump laser 10 is a 250-kHz Ti:sapphire regenerative amplifier with a central wavelength of 808 nm, producing transform-limited 35-fs pulses with ~25 nm FWHM bandwidth. A grating-based compressor of the laser (not separately shown) may be used to introduce a positive chirp to elongate the pulses to a duration of ~200-300 fs. In various embodiments of the invention, source 10 may be characterized by a pulse duration (FWHM) of 30-800 fs, however all pulse durations are within the scope of the present invention. The pulse energy (incident laser power) is varied by a neutral-density filter (NDF) 11 within an energy range of 0.08-0.56 µJ (corresponding to a range of average incident power between 20 and 140 mW). Aspheric lens 12 couples the ~1 mm diameter laser beam into a length of fiber of length on the order of 20-cm mounted on a 3-axis fiber positioner 17, enabling a typical free-space-to-fiber coupling efficiency of greater than 50%.

Figure 2:
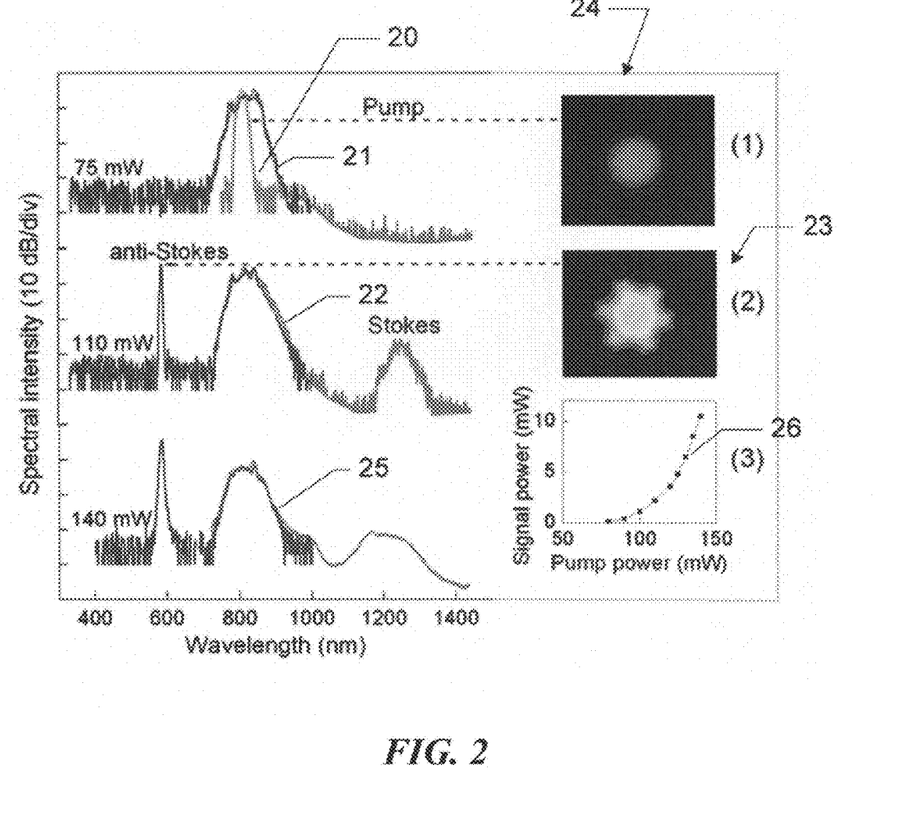
FIG. 2 plots the dependence of the output spectra of a PCF on pump power under conditions of FWM, in accordance with embodiments of the present invention.
Figure 3:
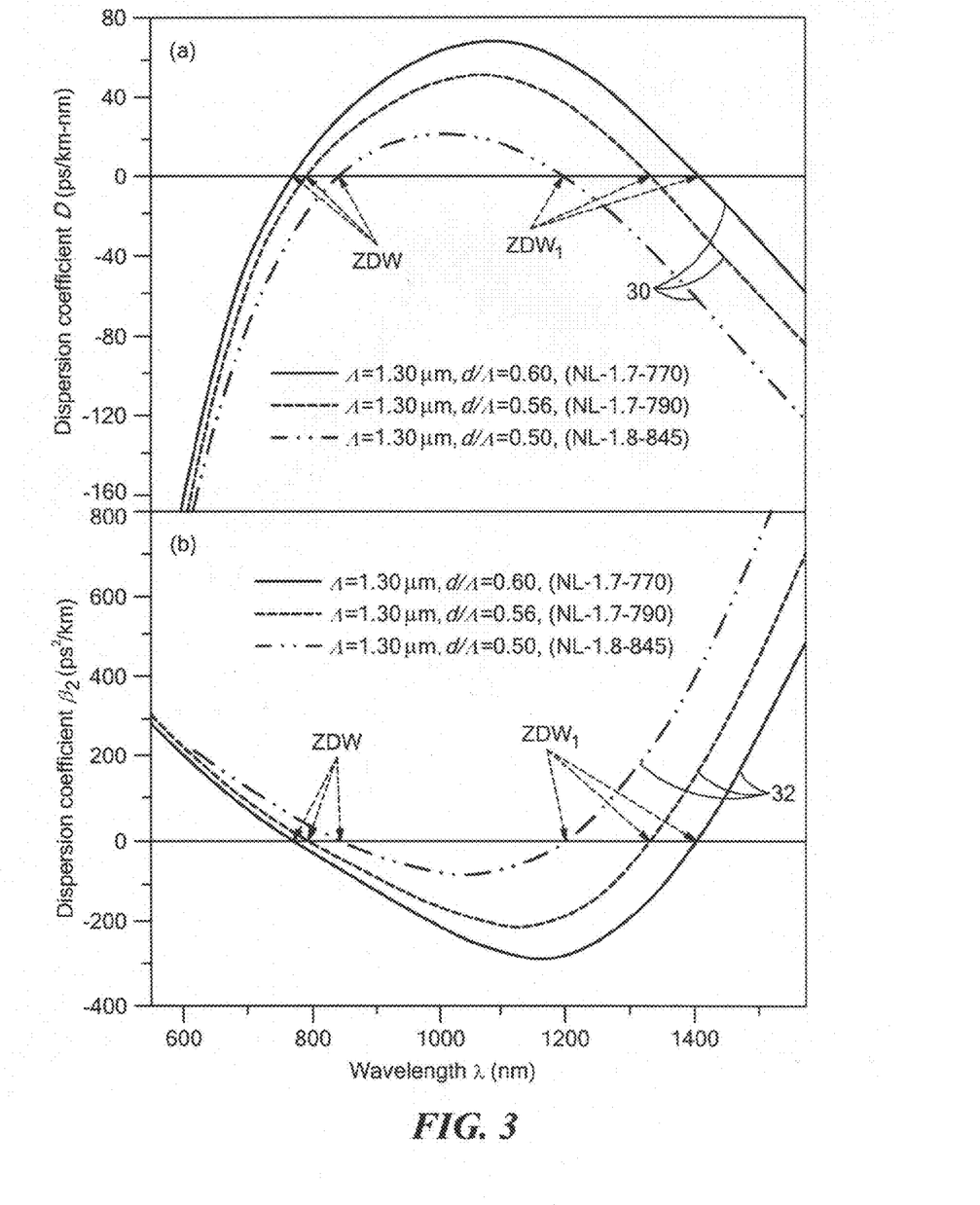
FIGS. 3(a) and 3(b) depict calculated group dispersion profiles for three typical PCFs employed in practice of the invention, with FIGS. 3(a) and 3(b) showing the dispersion coefficients D and $\beta_2$, respectively, versus wavelength.

The dependence of the output spectra of the fiber on the pump power is now described with reference to FIG. 2. The initial pump spectrum, incident on the PCF, is designated by numeral 20 in FIG. 2. At a pump power of 75 mW, no sidebands are evident in the neighborhood of the pump spectrum, which undergoes broadening due to self-phase modulation, and, upon exiting the PCF, appears as designated by numeral 21. The broadened pump spectrum 21 obtained from the spectrometer approximates that obtained from the spectrum analyzer. However, if the pump power is increased to 110 mW, the fiber simultaneously produces strong blue-shifted yellow (586 nm) light with a frequency-shift of 4700 cm$^{-1}$ and weaker red-shifted infrared light (~1250 nm) with an approximately equal frequency-shift, as shown in the spectrum designated by numeral 22. The positions of these sidebands are in striking coincidence with the Stokes and anti-Stokes wavelengths calculated from the multipole method. Also, the apparently different far-field patterns of the visible sideband 23 and the pump 24 recorded by camera, are also shown in FIG. 3, suggesting that they propagate in different fiber modes. The corresponding near-field patterns of pump and visible sidebands suggest that the near-field pattern of the pump apparently corresponds to the intensity field of the fundamental PCF mode while that of the visible sideband to the intensity field of the second PCF mode. Such mode assignments are consistent with the intermodal FWM discussed above and confirm the presence of intermodal FWM.

At a higher pump power of 140 mW the infrared idler undergoes significant spectral broadening to merge with the red edge of the residual pump, as shown in the spectrum designated by numeral 25. This is because the Stokes wavelength (~1250 nm) resides in the anomalous regime of the second mode and can induce a supercontinuum (SC) through a soliton-assisted mechanism. Since the observed anti-Stokes wavelength is insensitive to the pump power, as apparent by comparing the anti-Stokes intensity at 110 mW and 140 mW pump levels in FIG. 3, neglecting the nonlinear contribution $2\gamma P$ in the phase-matching condition is justified a posteriori.

The insensitivity of anti-Stokes wavelength to pump power is likely due to the chirp-enhanced pulse broadening which rapidly decreases the peak pump intensity. The signal power as a function of the pump power, depicted by the curve designated by numeral 26, indicates a threshold pump power of 80 mW and follows a super-linear relation beyond the threshold. The conversion efficiency from the incident pump to the spectrally-isolated anti-Stokes signal surpasses 7% at the highest pump powers. At comparable Stokes-shifts, this efficiency is more than three times larger than achieved in the prior art using specially designed PCF and single-mode FWM. More importantly, the excitation of the FWM in the largely normal dispersion regime significantly suppresses the SC contamination of the signal observed in this single-mode OD-FWM.

In accordance with embodiments of the present invention, the pump wavelength can be tuned within 800-825 nm to generate the same FWM with somewhat different Stokes-shift. The anti-Stokes wavelength is centered at 585.8, 586.1, and 586.5 nm at the pump wavelength of 800 nm, 808 nm, and 825 nm, respectively. This observation confirms the prediction from the multipole method that the anti-Stokes wavelength is insensitive to the pump wavelength. Such property may be desirable to produce constant-wavelength signal by a pump laser that suffers long-term wavelength drifting. Another rather unusual property of the intermodal FWM is that its efficiency is extremely sensitive to the bending close to the entrance end of the fiber. The bending with a radius as large as 10 mm effectively suppresses the FWM process. This suppression can be reversed by straightening the fiber so that the FWM can be switch on and off rapidly by alternating the bending and the straightening. This is not surprising because the OD-FWM is a stimulated process dependent on the seed of the idler propagating in the largely leaky second mode, which can be dissipated by bending the fiber entrance. The third unusual property of the intermodal FWM is the critical role of the initial positive chirp introduced to the incident pump pulses. Complete suppression of the FWM process occurs if this chirp is removed. This observation may be partly attributed to the considerably reduced free-space-to-fiber coupling efficiency (~20%) occurring for transform-limited incident pulses, which is likely caused by a self-focusing or filamentation effect under high peak intensity irradiation. More likely, the chirp speeds up the broadening of the pump pulses to suppress the walk-off effect of the interacting pulses that limits the efficiency of the FWM pumped by transform-limited pulses. The combined effects of the chirp/width of the pump pulses, the wavelength and the power of the pump, the length of the fiber, and the microstructure of the PCF on the FWM efficiency and the properties of the anti-Stokes pulses will be investigated in future detailed studies.

Supercontinuum-Free and Widely Tunable Up-Conversion Using Cherenkov Radiation

The foregoing scheme, however, employing FWM, fails to provide wide tunability of the signal by finely adjusting the pump wavelength, and therefore the signal wavelength tunability must resort to a series of PCFs with different dispersion profiles. Other embodiments of the invention, however, employing Cherenkov radiation (CR), allow the near-infrared tuning range of a Ti:sapphire laser to be effectively extended to the entire visible region, as now described, while still allowing the use of well-characterized PCFs that can be designed in a straightforward manner.

The cross-sectional structure of the fibers may be characterized in terms of a pitch $\Lambda$ and the ratio $d/\Lambda$, thereby permitting the dispersion profile of the fibers to be calculated from a multipole method as described by White et al. (2002). This profile has little dependence on the number of rings of holes surrounding the guided core, as long as this number is larger than 3. Therefore, the actual calculation may be performed by assigning an integer of 4 for any actual number exceeding 3. Although the cross-sectional image itself can only yield highly approximate values of $\Lambda$ and $d/\Lambda$, a fit to manufacturer-specified ZDW (presumably measured by the time-of-flight method from long fiber) and the measured $ZDW_1$ allows the two values to be accurately refined, and the corresponding dispersion profile can be determined, as shown in FIGS. 3($a$) and 3($b$), showing, respectively, the set of curves corresponding to the dispersion coefficient D (curves 30) for three typical PCFs of the class described, and the set of curves corresponding to the dispersion coefficient $\beta 2$ (curves 32) for the same three PCFs.

Figure 4:
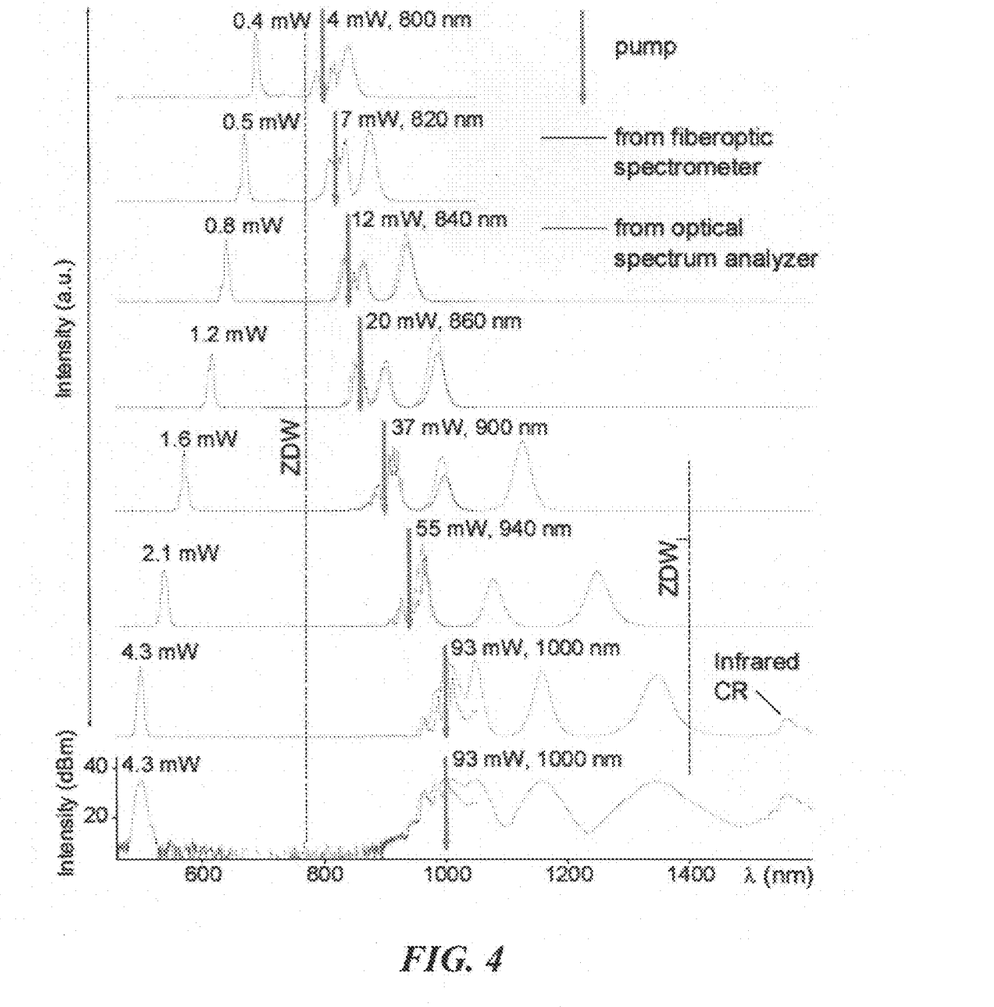
FIG. 4 depicts eight spectra corresponding to the pumping of a 71-cm long segment of NL-1.7-770 PCF with varying pump wavelength and pump input power.

In the case of the PCF designated as NL-1.7-770, where the ZDW lies consistently shortward of the pump wavelength, typical output spectra as a function of both pump wavelength and pump input power are depicted in the successive plots of FIG. 4. The output of the fiberoptic spectrometer provides the shorter-wavelength components (depicted in blue) of the respective spectra, while the longer-wavelength components of the respective spectra (depicted in red) reflect the output of an optical spectrum analyzer. The pump wavelength, varying over the range of 800-1000 nm, is shown by a downward-pointing arrow 40. The upconverted Cherenkov radiation appears as a peak 42 on the left of each spectrum, well isolated from any other emission.

As evident in FIG. 4, the spectrum at wavelengths longer than the pump, wavelength exhibits the expected signature of dynamically evolved solitons, as discussed in Banaee et al., *High-order soliton breakup and soliton self-frequency shifts in a microstructured optical fiber, J. Opt. Soc. Am. B*, vol. 23, pp. 1484-89 (2006), which is incorporated herein by reference. The spectrum at wavelengths shorter than the pump wavelength, however, displays only a single narrowband emission having a milliwatt-level power (measured after removing the infrared power by means of 700-nm cutoff filters), and that narrowband emission illuminates the fiber with visible scattered light.

As also apparent in FIG. 4, the narrowband visible emission 42 generally undergoes a further blue-shift with increasing pump wavelength. Thus, peak 42 appears at successively shorter wavelengths as the wavelength of pump 40 moves to longer wavelengths. Also, at a constant pump wavelength of 960 nm, the narrowband emission 42 undergoes a blue-shift with increasing input power, and also gains amplification exponentially beyond a threshold input power at the expense of the output power of the solitons, as shown in FIGS. 5($a$)-5($d$), where peak 50 is the narrowband visible component, and peaks 51 and 52 are successive first and second solitons.

Experiments were performed in order to ascertain whether the observed visible narrowband emission might be attributable to the blue-shifted pulse trapped by the first and the strongest fundamental soliton undergoing the largest red-shift. Such a phenomenological interpretation would predict that the visible emission undergoes continuous blue-shift along the fiber to attain a group velocity that matches the decreasing group velocity of the red-shifted soliton, i.e., the blue and red edges of the output spectrum are group-index-matched. To investigate this, a cut-back technique was employed, shortening the fiber 13 to 21 cm, and replicating the conditions of FIG. 5($b$). The output spectrum from the shortened fiber reveals no wavelength shift (within 2 nm) for the visible emission, even though the first soliton suffers considerable (~120 nm) red-shift along the fiber, as shown in FIG. 5($d$). Also, the power of the visible emission remains the same. By virtue of this absence of wavelength shift and power variation for a variety of experimental conditions given in FIGS. 5($a$)-5($d$), it appears that the visible emission is not due to pulse trapping. On the other hand, all these results are consistent with the CR nature of the emission. Because the generation of the visible CR pulse is completed within the first few centimeters of the fiber, the pulse simply undergoes normal dispersion further down the fiber and suffers no substantial wavelength shift or power variation.

Figure 5:
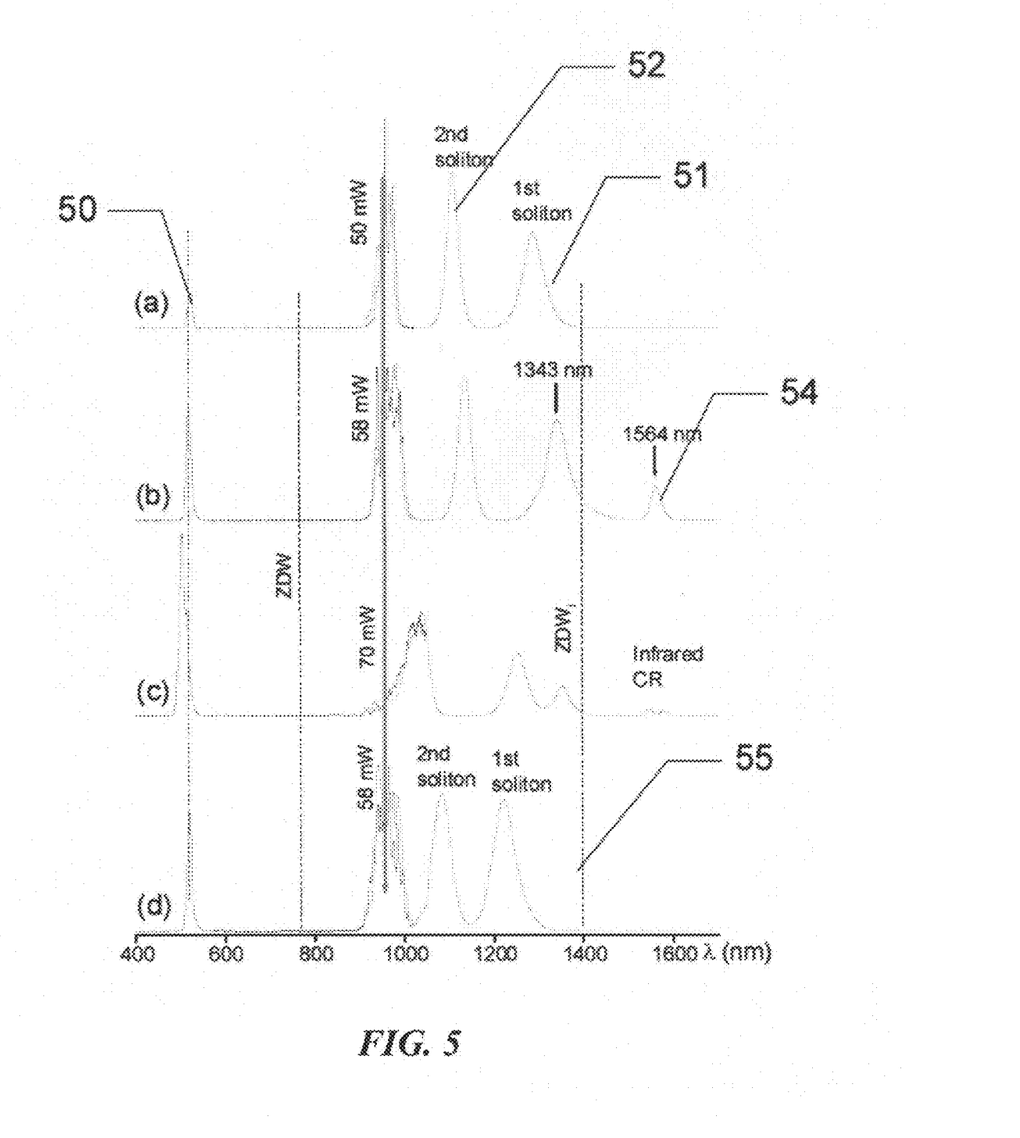
FIGS. 5(a)-5(c) are output spectra from a 71-cm long NL-1.7-770 PCF at a constant pump wavelength of 960 nm and at varied pump powers as shown.
FIG. 5(d) is an output spectrum at a pump wavelength of 960 nm and a pump power of 58 mW after the 71-cm fiber is shortened to 21-cm, all in accordance with embodiments of the present invention.

Whenever the red-wavelength tail of the most red-shifted soliton approaches 1400±20 nm, an emission at 1560±10 nm emerges, as designated by numeral 54 in FIG. 5($b$). A further increase of the input power does not allow the red-shifted soliton to cross this wavelength boundary, as evident in FIG. 5($c$). This effect, known as soliton self-frequency shift cancellation is discussed in Skryabin et al., *Soliton self-frequency shift cancellation in photonic crystal fibers, Science*, vol. 301, pp. 1705-08 (2003), which is incorporated herein by reference. Thus, the 1560-nm emission 54 may be assigned to a red detuned CR of the soliton and the 1400-nm boundary 55 to an infrared zero-dispersion wavelength of the fiber, denoted as $ZDW_1$. In summary, any pronounced feature in the output spectrum is spectrally well-isolated and can be assigned either to a soliton (experiencing significant Raman self-frequency shift or remaining close to the pump wavelength) or its secondary emission of CR (propagating in the visible or the infrared normal dispersion regimes).

The supercontinuum-free operation is advantageously achieved by detuning the pump wavelength far away from the ZDW and progressively decreasing the input power when the pump wavelength approaches the ZDW, as shown in FIG. 4. By employing the same strategy, such condition can be attained in other nonlinear PCFs including a 40-cm NL-1.7-790 fiber and a 40-cm NL-1.8-845 fiber.

Within the limited dynamic detection range of the fiber-optic spectrometer (~35 dB), no indication of supercontinuum onset was detected in the log-scale around the visible CR of multimilliwatt power depicted in plot FIG. 4). Previous studies in the context of supercontinuum generation have pointed out that the pump wavelength should not be detuned far away from the ZDW of the fiber for effective CR amplification because this occurs only if CR overlaps spectrally with the multisoliton state of the input pulse undergoing strong temporal compression. Such teachings may be found, for example, in Cristiani et al., *Dispersive wave generation by solitons in microstructured optical fibers, Opt. Express*, vol. 12, pp. 124-35 (2004), and Genty et al., *Enhanced bandwidth of supercontinuum generated in microstructured fibers, Opt. Express*, vol. 12, 33471-80 (2004). In contrast, FIG. 4 shows that the effect of exponential amplification of CR with increasing input power easily overcomes such effect of inefficient spectral overlapping, allowing strong emission of CR with large up-converted frequency. In accordance with preferred embodiments of the invention, the excited nonlinear process produces a single isolated spectral band in the visible that is characterized by central wavelength, a 10 dB bandwidth of less than 50 nm, and a power spectral density exceeding that of any continuum emission adjacent to it by at least 10 dB.

Figure 6:
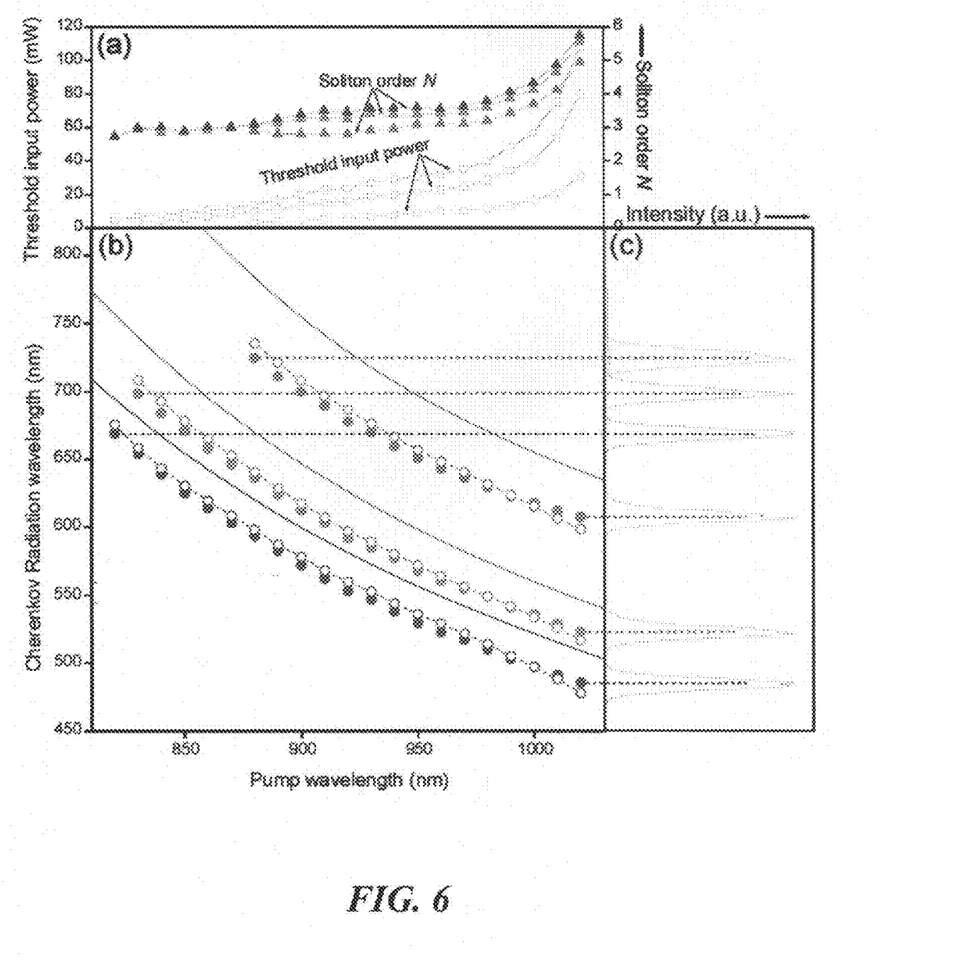
FIG. 6(a) shows the threshold input power and solution order for three distinct photonic crystal fibers as a function of pump wavelength.
FIG. 6(b) shows the observed and calculated CR wavelength as a function of pump wavelength for the three fibers.
FIG. 6(c) shows the observed CR spectrum as a function of pump wavelength for the three fibers, all in accordance with embodiments of the present invention.

In contrast to the conditions shown in FIG. 4 in which the input power is set to generate relatively strong CR, the input power may also be lowered (by up to 50%) toward a threshold where the CR is minimally observable. For the same three fibers discussed above (i.e., the 71-cm NL-1.7-770 before the cut-back, the 40-cm NL-1.7-790, and the 40-cm NL-1.8-845), the threshold input powers, the corresponding CR wavelengths, and CR spectra as functions of the pump wavelength are shown in FIGS. 6(a), 6(b), and 6(c), respectively. FIG. 6(a) shows the threshold input power (designated by open squares) or the soliton order (designated by solid triangles), of CR for a 71-cm NL-1.7-770 (top curve of each set), a 40-cm NL-1.7-790 (middle curve of each set) or a 40-cm NL-1.8-845 (lower curve of each set) fiber. FIG. 6(b) shows the observed and calculated CR wavelength as a function of pump wavelength for the three fibers, and FIG. 6(c) shows the observed CR spectrum as a function of pump wavelength for the three fibers. The threshold input power at a given pump wavelength and the tuning range of the CR are seen to differ considerably among the fibers. The CR, however, has a Gaussian-like spectrum with a nearly constant bandwidth (FWHM) of less than 50 nm, and typically ~10 nm, as shown in FIG. 6(c), regardless of the fiber type and the pump wavelength. All these results can be understood from the dispersion profiles of the fibers, as discussed in detail by Tu et al., *Optical frequency up-conversion by supercontinuum-free widely tunable fiber-optic Cherenkov radiation*, Opt. Express, vol. 17, pp. 9858-72 (Jun. 8, 2009), which is incorporated herein by reference.

Figure 7:
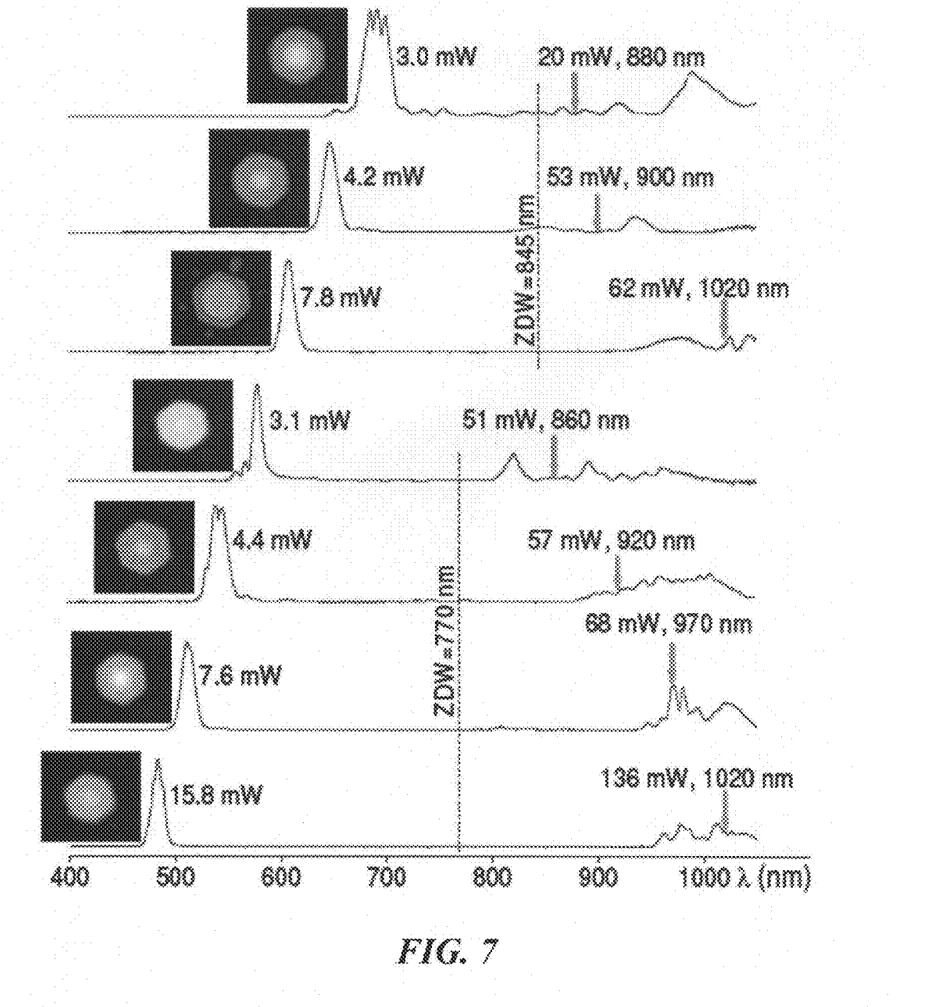
FIG. 7 shows the CR spectrum and the power in the Cherenkov radiation as a function of pump-wavelength and input-power for an 8.3-cm length of NL-1.8-845 fiber (upper 3 traces) and a 7.2-cm NL-1.7-770 fiber (lower 4 traces). The insets represent the far-field images of the exiting light from the fibers.

While experiments discussed above with reference to FIG. 4 were performed on relatively long (>30 cm) fiber and low input power in order to clarify the physical mechanism of the CR generation, the condition of shortened fiber and increased input power is favored in the practical application of the CR, which demands multimilliwatt output power without introducing unnecessary temporal dispersion to the CR pulses. The typical CR spectrum (from the fiber-optic spectrometer) and power as functions of the pump wavelength and the input power are shown in FIG. 7 for a 7.2-cm NL-1.7-770 fiber and a 8.3-cm NL-1.8-845 fiber. In the case of the NL-1.7-770 fiber, 15.8 mW of 482-nm supercontinuum-free CR can be generated at a pump wavelength of 1020 nm and an input power of 136 mW, corresponding to a rather moderate input peak intensity of 8.5 kW. When the pump wavelength is progressively shifted toward the ZDW to generate the CR of longer wavelengths, the input power is preferably lowered to suppress the supercontinuum onset, and the CR power is therefore decreased, as shown in FIG. 7.

When the pump wavelength reaches 860 nm, the supercontinuum-free operation can only support 3.1 mW of 578-nm CR. During this process, the Gaussian-like spectrum of the CR evolves into a relatively irregular spectral peak, suggesting the influence from the supercontinuum onset. Thus, the pump wavelength should be detuned toward the deeply anomalous dispersion region of the fiber to obtain strong and clean CR.

Figure 8:
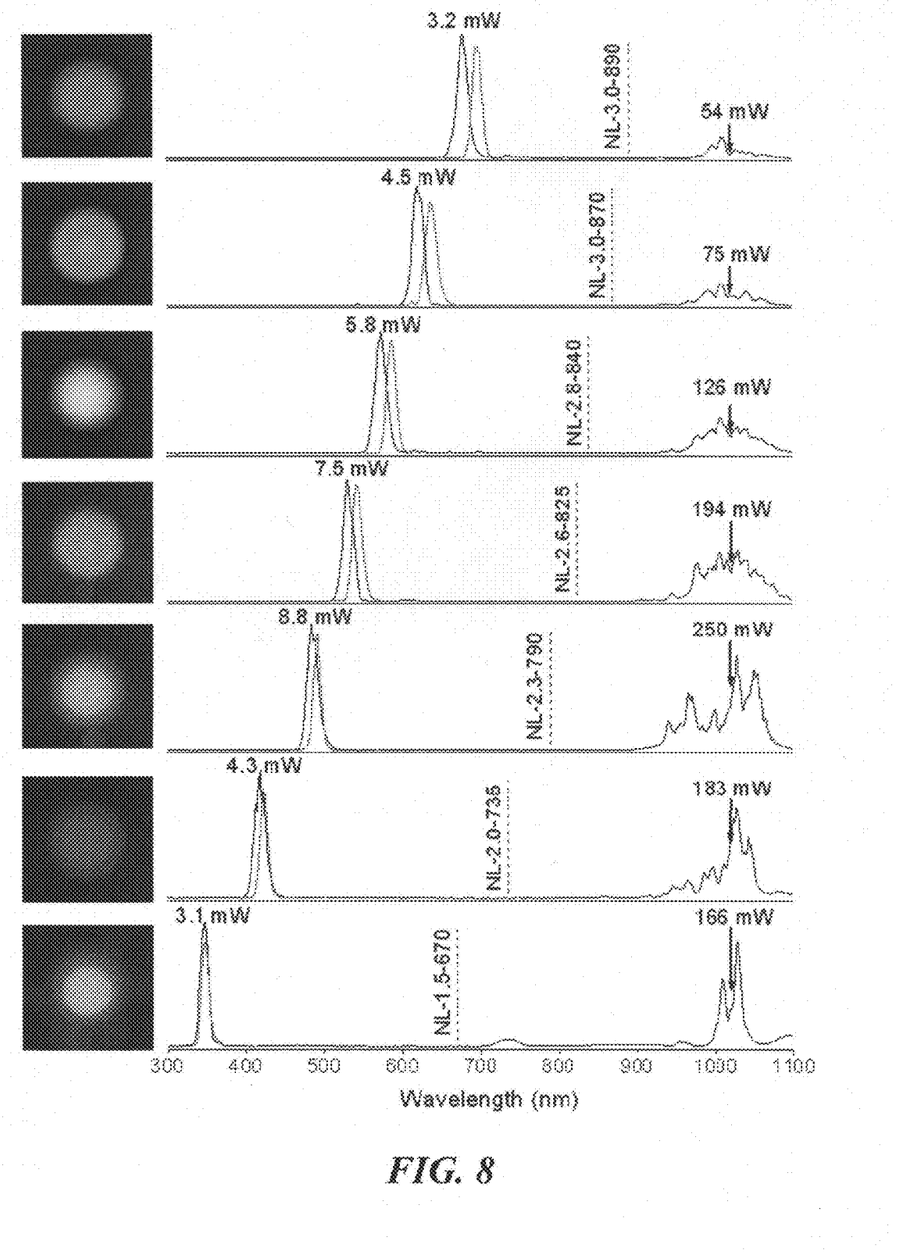
FIG. 8 depicts typical output spectra of a series of PCF segments pumped at a fixed wavelength of 1020 nm in accordance with embodiments of the present invention.

In a series of experiments, short (15-18 cm) PCFs consisting of 13 distinct commercial fibers were pumped at a fixed wavelength of 1020 nm by an unamplified Ti:sapphire laser. Typical output spectra from the series of PCFs pumped at an average power of 54-250 mW are shown in FIG. 8. In the UV-visible region, the spectrum from each fiber exhibits a single Gaussian-shaped band having a 3-dB bandwidth of ~15 nm and an average power of a few mW, measured after removing the infrared power by two visible-infrared cutoff filters. The far-field images of the output light (shown in respective insets of FIG. 8) indicate that this band propagates in the fundamental-mode of the fiber. The pump power can be lowered by 30-50% toward a threshold where this band is minimally observable at a slightly red-shifted central wavelength.

As evident in FIG. 8, the CR wavelength can be varied across 347-680 nm, and may target a specified wavelength, with images of the output designated by numeral 80. Coverage of the entire range may be obtained by tuning pump power, or by substituting PCFs of distinct dispersion property, or by a combination of the foregoing. Thus, a kit may be provided of types of particular PCFs in order to achieve a desired range of wavelength coverage. The pulse duration of the CR signal depends on the fiber length, and is on the order of a few ps for a length on the order of ~10 cm, and may advantageously be nearly-transform-limited in the fs regime for shorter lengths.

Optical frequency synthesis of exquisite precision may be obtained using so-called f-to-2f self-referencing. This requires a source spectrum containing components that span an entire octave. A description of the technique may be found in Ye and Cundiff, *Femtosecond optical frequency comb technology* (Springer, 2005), which is incorporated herein by reference. Generating a full octave of bandwidth via standard PCF supercontinuum generation is challenging, moreover, the fiber may suffer long-term instability. With typical 10 nm tunability by varying pump intensity, frequency up-converted CR wavelength separated exactly by an octave from a fixed pump wavelength may be generated from an optimally selected PCF using the methods in accordance with the present invention (see FIG. 8). Thus it is particularly advantageous to implement optical frequency synthesis according to the method reported by Pal et al., *Self referenced Yb-fiber-laser frequency comb using a dispersion micromanaged tapered holey fiber*, Opt. Express, vol. 15, pp. 12161-12166 (2007). In that paper a specific laser fabrication procedure was required to modify the PCF to generate the CR of desired wavelength, in contrast to the present invention that employs commercially available PCFs to target the desired CR wavelength. Apparatus and methods in accordance with the present invention overcome the instability limitation of the prior art and providing for advantageous application in optical frequency synthesis.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method for generating broadly tunable visible or ultraviolet optical pulses, substantially free of non-frequency-specific supercontinuum emission, the method comprising:
   a. providing a pulsed source for generating pump pulses characterized by a spectrum having a central emission wavelength $\lambda_0$, a bandwidth, and an average power;

b. providing a photonic crystal fiber characterized by a short-wavelength zero dispersion wavelength; and c. pumping the fiber with the pump pulses at a pump wavelength, thereby exciting a nonlinear process in such a manner as to produce an isolated spectral band in the visible or ultraviolet characterized by a central wavelength that is tuned over a range of greater than 20 nm, wherein the isolated band in the visible or ultraviolet is further characterized by a 10 dB bandwidth of less than 50 nm, and a power spectral density exceeding that of any continuum emission adjacent to it by at least 10 dB, wherein the average power in the isolated spectral band exceeds 0.1 mW.

2. A method in accordance with claim 1, wherein the central wavelength of the isolated spectral band is fine tuned by varying the average power characterizing the pump pulses.

3. A method in accordance with claim 1, wherein the zero dispersion bandwidth is displaced by more than 100 nm from $\lambda_0$.

4. A method in accordance with claim 1, wherein the nonlinear process is four-wave mixing.

5. A method in accordance with claim 1, wherein the nonlinear process is dispersive wave generation.

6. A method in accordance with claim 1, wherein the pulsed source is a pulsed laser.

7. A method in accordance with claim 1, wherein the pump pulses are substantially transform-limited in bandwidth.

8. A method in accordance with claim 1, further comprising tuning the central wavelength of the isolated spectral band in the visible or ultraviolet by at least one of varying the wavelength of the pump source and switching photonic crystal fibers with different dispersion properties.

9. A method in accordance with claim 1, further comprising generating a self-referenced optical frequency comb based at least on the frequency up-converted isolated spectral band.

* * * * *